US012083417B2

(12) United States Patent
Morrison et al.

(10) Patent No.: US 12,083,417 B2
(45) Date of Patent: Sep. 10, 2024

(54) RECONFIGURABLE USER INPUT ELEMENT

(71) Applicant: Dell Products L.P., Round Rock, TX (US)

(72) Inventors: Jason Scott Morrison, Chadron, NE (US); Christopher A. Torres, San Marcos, TX (US)

(73) Assignee: Dell Products L.P., Round Rock, TX (US)

( * ) Notice: Subject to any disclaimer, the term of this patent is extended or adjusted under 35 U.S.C. 154(b) by 373 days.

(21) Appl. No.: 17/647,711

(22) Filed: Jan. 11, 2022

(65) Prior Publication Data

US 2023/0218987 A1    Jul. 13, 2023

(51) Int. Cl.
*A63F 13/24*         (2014.01)

(52) U.S. Cl.
CPC ...... *A63F 13/24* (2014.09); *A63F 2300/1043* (2013.01)

(58) Field of Classification Search
CPC .......................... A63F 13/24; A63F 2300/1043
See application file for complete search history.

(56) References Cited

U.S. PATENT DOCUMENTS

| | | | | |
|---|---|---|---|---|
| 6,071,194 A * | 6/2000 | Sanderson | ............... | A63F 13/22 463/37 |
| 7,310,084 B2 * | 12/2007 | Shitanaka | ............... | G05G 9/047 345/184 |
| 8,493,325 B2 * | 7/2013 | See | ..................... | G06F 3/033 345/157 |
| 8,717,199 B2 * | 5/2014 | Filson | ................... | G06F 3/0219 341/20 |
| 10,427,037 B2 * | 10/2019 | Strahle | .................. | A63F 13/285 |
| 10,888,776 B2 * | 1/2021 | Palmer | ................. | G06F 3/0393 |
| 2005/0255915 A1 * | 11/2005 | Riggs | ...................... | A63F 13/24 463/37 |
| 2012/0050232 A1 * | 3/2012 | Ikeda | ...................... | A63F 13/24 345/184 |
| 2013/0271302 A1 * | 10/2013 | Filson | ................... | H01H 11/00 341/33 |

* cited by examiner

*Primary Examiner* — Omkar A Deodhar
*Assistant Examiner* — Shauna-Kay Hall
(74) *Attorney, Agent, or Firm* — Norton Rose Fulbright US LLP

(57) ABSTRACT

A single user input element can be used in four different modes including a first mode in which the user input element mimics a single button by restricting input along multiple axes, a second mode in which the user input element restricts input to a first axis, a third mode in which the user input element restricts input to a second axis, and a fourth mode in which the user has no restrictions to user input. A rotational cam may be used to interact with shuttle pins that control the height of a surface (e.g., an up/down position) of the plurality of fill spacers to change a look and/or feel of the user input element. A rotational structure which has lockout tabs to prevent individual rotational axis from being rotated depending on the configuration of the input device. These aspects may provide a reconfigurable direction pad for a game controller.

19 Claims, 13 Drawing Sheets

RECONFIGURABLE USER INPUT ELEMENT

FIELD OF THE DISCLOSURE

The instant disclosure relates to information handling systems. More specifically, portions of this disclosure relate to reconfiguring a user input element of a user input device, such as by controlling which axes of a direction pad of a gaming controller may receive user input.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems. A user may interact with information handling systems through hardware components configured as user input devices and software configured to process input from the user input devices.

User input devices, including handheld videogame controllers, are used when operating various computer applications to enable users to provide input to operate various functions of the computer application. For example, a gaming controller can operate in conjunction with a gaming device to enable a user to provide input into an application, such as a video game, to control an object or character, select audio and/or video content, or otherwise control aspects related to the gaming device. Gaming controllers typically include multiple depressible buttons and one or more control sticks-which are able to be moved relative to a default position-that are controlled by a user to provide the input.

SUMMARY

User input devices are conventionally fixed devices that allow users to provide user input in a specific manner. Devices, such as game controllers, to support a wide spectrum of applications may include multiple different button layouts on a single controller, layouts that may include one or more of different kinds of user input elements. For example, a game controller may include two electronic joysticks. This allows a user input device to support gameplay in one kind of application (e.g., a first game using two joysticks) and gameplay in a second kind of application (e.g., a first game using one joystick and one direction pad, and a second game using one two joysticks).

Shortcomings mentioned here are only representative and are included to highlight problems that the inventors have identified with respect to existing user input devices and sought to improve upon. Aspects of the user input devices described below may address some or all of the shortcomings as well as others known in the art. Aspects of the user input devices described below may present other benefits than, and be used in other applications than, those described herein.

Aspects of embodiments described herein allow a user input element, such as a direction pad, to be cycled through different modes, to allow reconfigurability within one user input element of an input device. Each configuration may correspond to a different number of buttons and functions. In some embodiments, this may be accomplished by creating moving sections between raised sections of a standard direction pad and then driving those moving sections to an up or down motion. Coupling of the components of the user input element may provide a mechanical interaction that reconfigures the user input element. In some embodiments, there may be moving sections that are raised or lowered by rotating the user input element causing each of the moving sections to interact with cams that set their positions. Increasing a height of user input elements provides tactile and/or visual feedback to a user regarding allowed user inputs.

In certain embodiments, a single user input element may be provided that can be used in four different modes including a first mode in which the user input element mimics a single button by restricting input along multiple axes, a second mode in which the user input element restricts input to a first axis, a third mode in which the user input element restricts input to a second axis, and a fourth mode in which the user has no restrictions to user input. In certain embodiments, a rotational cam is provided which interacts with shuttle pins that control the height of a surface (e.g., an up/down position) of the plurality of fill spacers to change a look and/or feel of the user input element. In certain embodiments, a rotational structure which has lockout tabs to prevent individual rotational axis from being rotated depending on the configuration of the input device.

According to one embodiment, an apparatus may include a user input element comprising at least four input arms arranged with at least two arms aligned along a first axis and at least two arms along a second axis; a plurality of fill tabs arranged circumferentially around the first axis and the second axis, each fill tab of the plurality of fill tabs located between two input arms of the at least four input arms; a configurator wheel coupled to each of the plurality of fill tabs, the configurator wheel comprising at least two rotatable features; and/or a configuration wheel coupled to the configurator wheel, the configuration wheel comprising at least two fixed features, wherein the at least two fixed features are configured to interact with the at least two rotatable features to configure the user input element. The at least two rotatable features of the configurator wheel may be configured to interact with the at least two fixed features of the configuration wheel to lock out movement along a first axis and a second axis.

According to another embodiment, a user input device apparatus may include a button; and a configurable direction pad, wherein the pad includes: four input arms arranged with a first arm and a second arm aligned along a first axis and a third arm and a fourth arm aligned along a second axis; and/or a plurality of fill tabs arranged circumferentially around the first axis and the second axis, each fill tab of the plurality of fill tabs located between two input arms of the at least four input arms. The configurable direction pad may be configured to provide at least four configurations, the at least four configurations including: a first configuration allowing user input along the first axis and the second axis; a second configuration allowing user input along the first axis and disallowing user input along the second axis; a third configuration disallowing user input along the first axis and disallowing user input along the second axis; and/or a fourth configuration disallowing user input along the first axis and allowing user input along the second axis. The apparatus may also include a communications interface; and a controller coupled to the button, to the configurable direction pad, and to the communications interface, wherein the controller is configured to receive user input through the button and the configurable direction pad and to transmit the user input through the communications interface.

According to a further embodiment, a method for configuring a user input device may include rotating a ring around a user input element to a first location at which a first feature of a configurator ring aligns with a second feature of a configuration ring such that the first feature interacts with the second feature to restrict movement of the user input element along a first axis; rotating a ring around the user input element to a second location at which the first feature of the configurator ring aligns with a third feature of the configuration ring such that the third feature interacts with the first feature to restrict movement of the user input element along the first axis and a second axis; and/or rotating a ring around a user input element to a third location at which the first feature of the configurator ring aligns with a fourth feature of the configuration ring such that the fourth feature interacts with the first feature to restrict movement of the user input element along the second axis. The rotating the ring around the user input element to the first location may include rotating the configurator ring and/or activating first cams to change a physical arrangement of the user input element to indicate restricted movement along the first axis. The activating the first cams may include raising a plurality of fill tabs to configure the user input element to mimic a two button element with the two button element receiving user input along the first axis.

The method may be embedded in a computer-readable medium as computer program code comprising instructions that cause a processor to perform operations corresponding to the steps of the method. In some embodiments, the processor may be part of an information handling system including a first network adaptor configured to transmit data over a first network connection; and a processor coupled to the first network adaptor, and the memory.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

These example embodiments describe and illustrate various user input devices for allowing a user to interact with an information handling system in different manners by allowing the reconfigurability of user input elements of the user input device. With such reconfigurability, the user input device, such as a game controller, may support multiple use scenarios and/or may provide flexibility in support different kinds of gaming applications.

Figure 1:
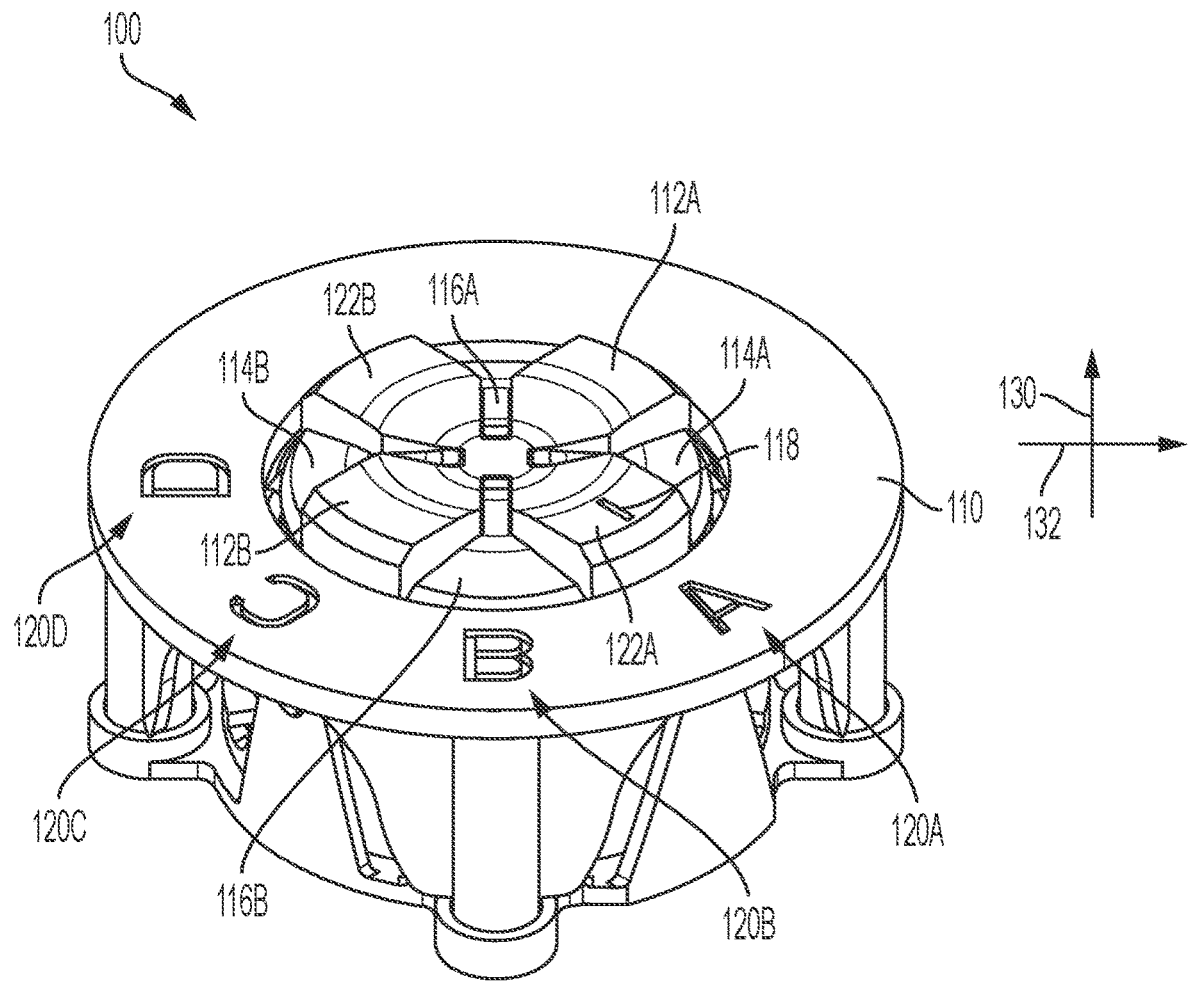
FIG. 1 is a perspective view of a configurable direction pad according to some embodiments of the disclosure.
Figure 2A:
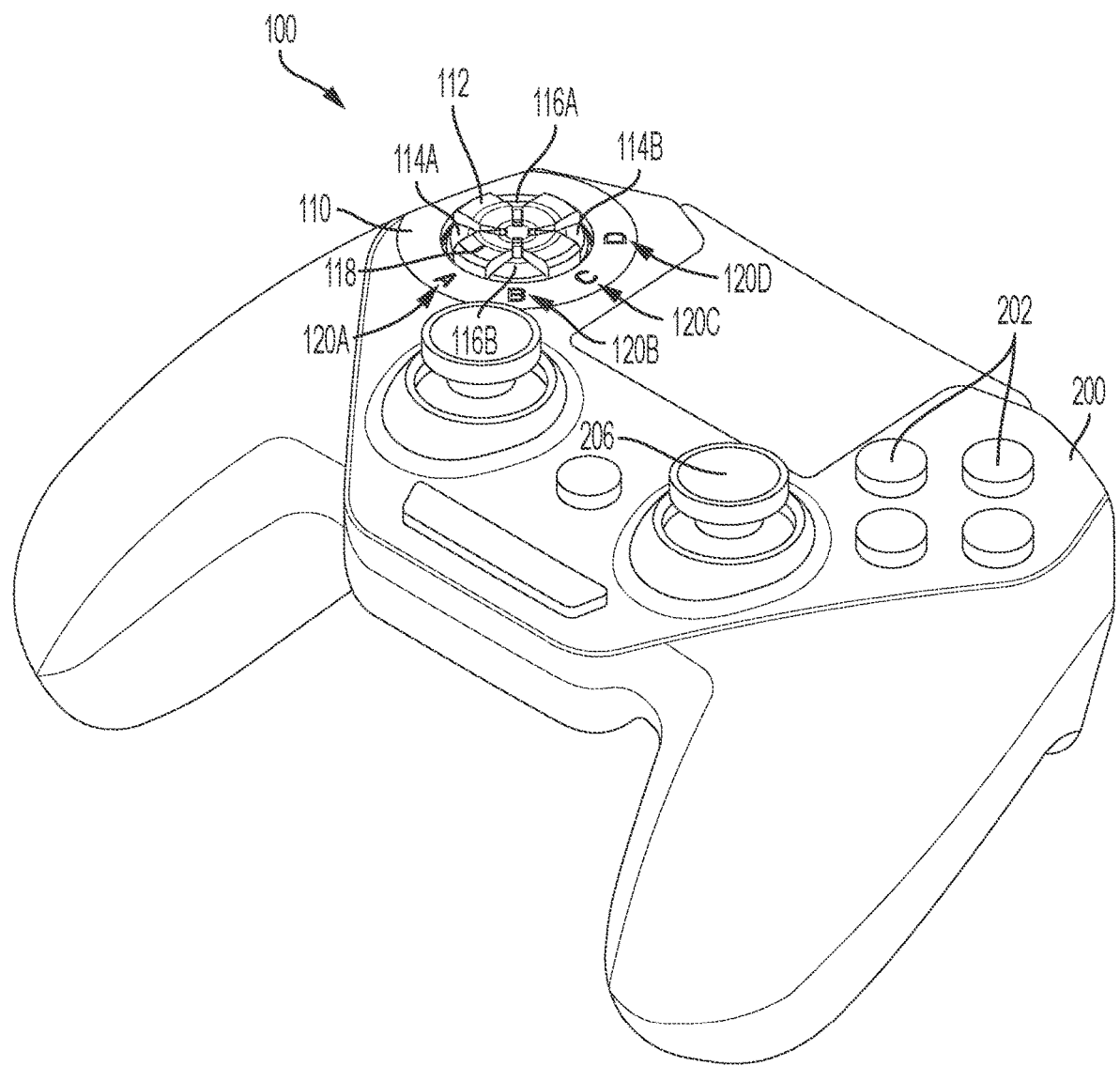
FIG. 2A is a view of perspective view of a game controller with a configurable direction pad in a first configuration according to some embodiments of the disclosure.
Figure 2B:
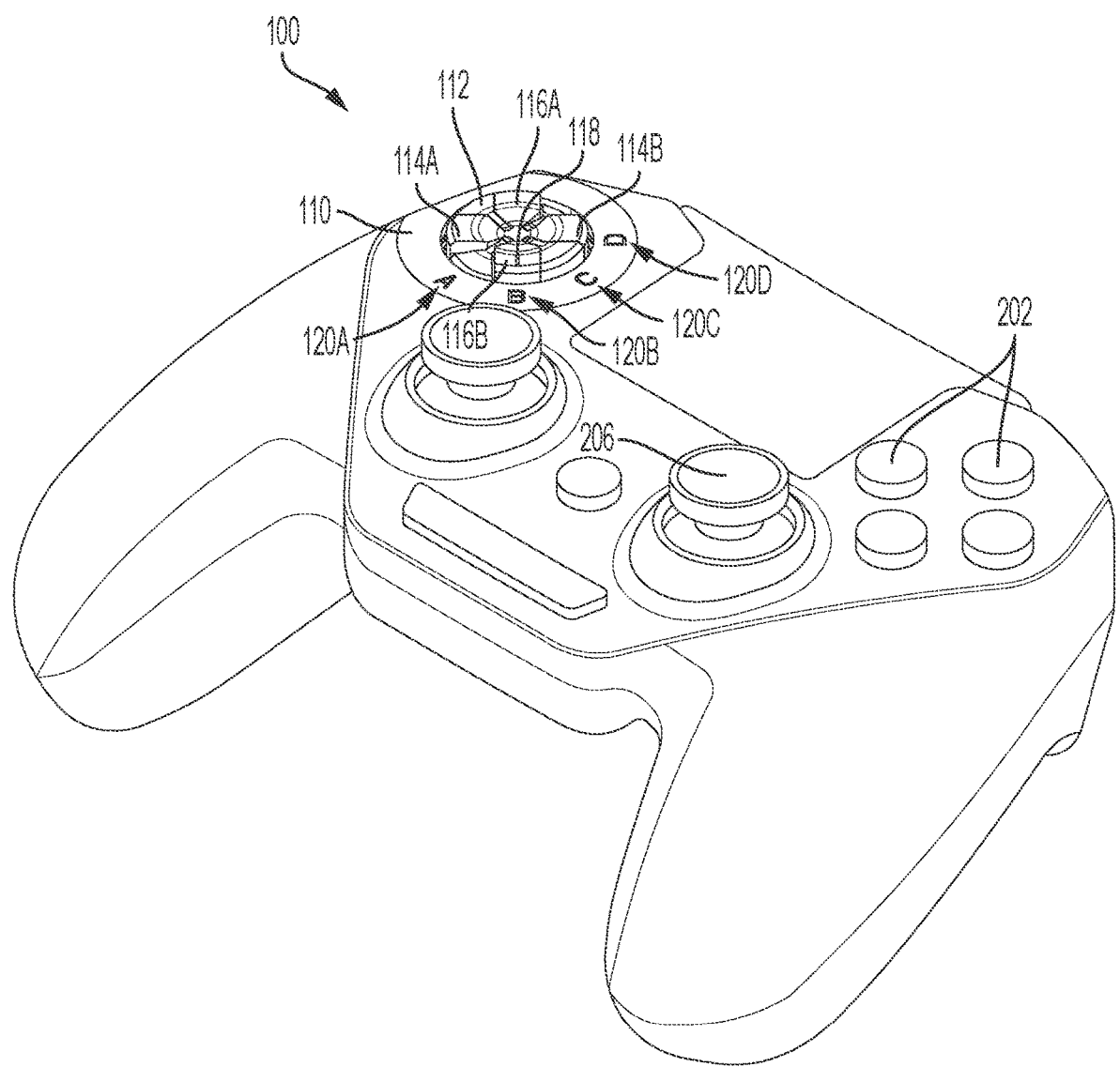
FIG. 2B is a view of perspective view of a game controller with a configurable direction pad in a second configuration according to some embodiments of the disclosure.
Figure 2C:
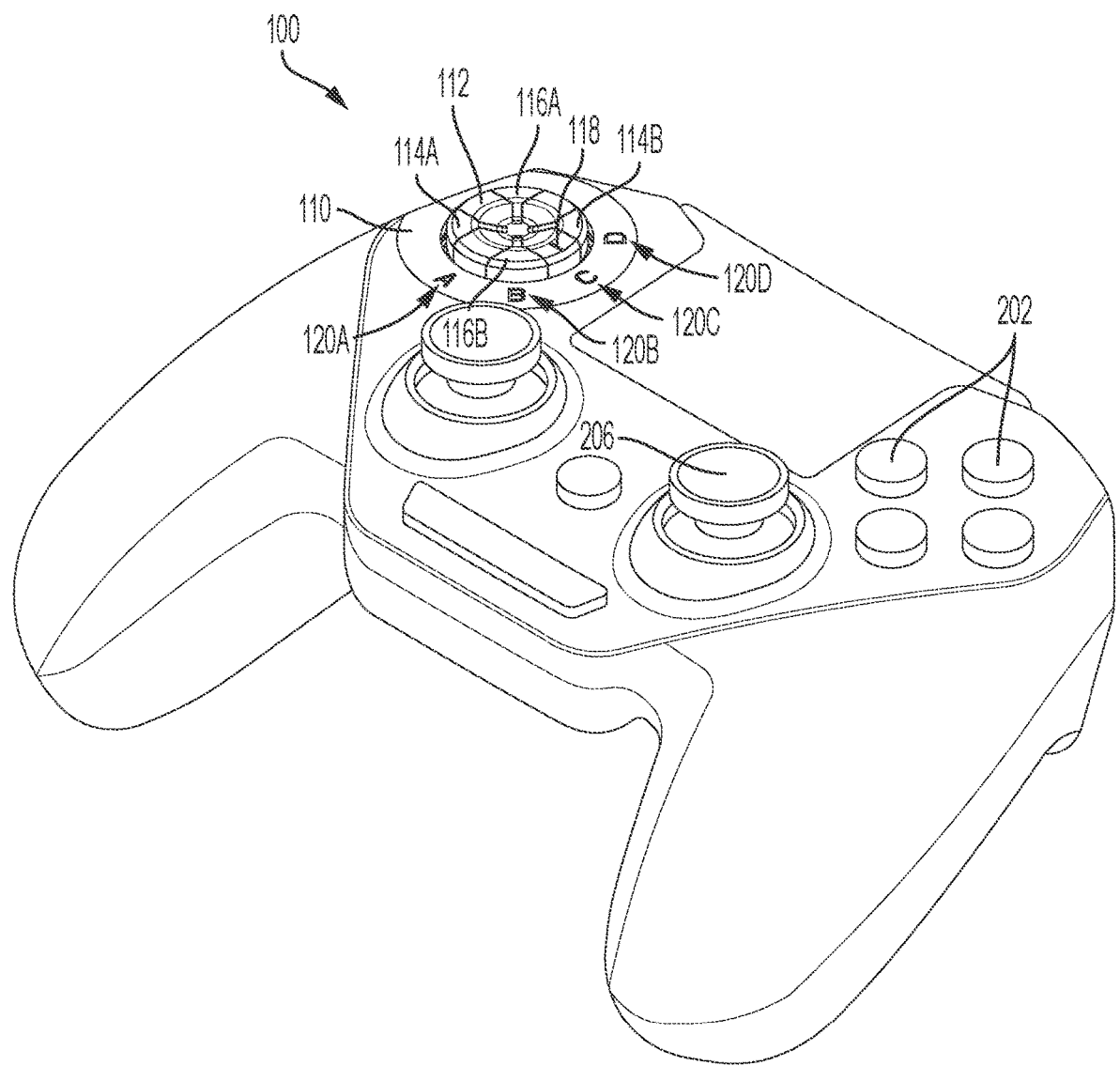
FIG. 2C is a view of perspective view of a game controller with a configurable direction pad in a third configuration according to some embodiments of the disclosure.
Figure 2D:
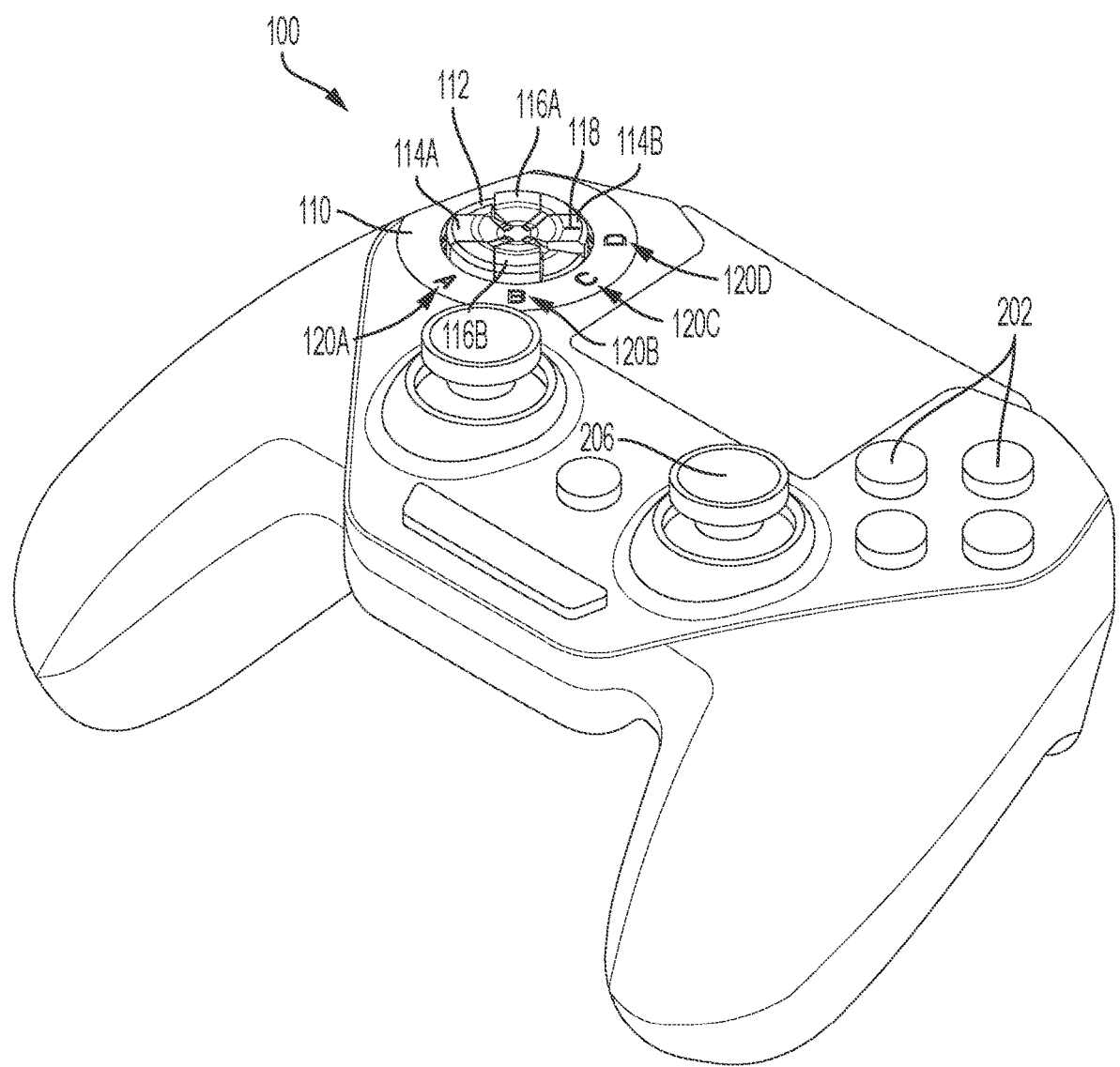
FIG. 2D is a view of perspective view of a game controller with a configurable direction pad in a fourth configuration according to some embodiments of the disclosure.

FIG. 1 is a perspective view of a configurable direction pad according to some embodiments of the disclosure. A user input element 100, such as the direction pad of FIG. 1, may include input arms 112A, 112B, 122A, and 122B for receiving user input. The arms may be arranged with at least two arms 112A and 112B aligned along a first axis and at least two arms 122A and 122B aligned along a second axis. The first and second axes may be arranged at a perpendicular angle or another angle. A user may provide input through the at least two arms 122A and 122B along two axes, such as to move an on-screen cursor, guide an airplane flight direction, aim a weapon, move a character in a virtual world, or the like. Each of the arms 112A, 112B, 122A, and 122B may be coupled to a switch to detect depression and/or an amount of depression of each of the arms by a user. The switch may include, for example, a physical electrical contact or an optical sensor. The input arms 112A, 112B, 122A, and 122B may be parts of a single physical piece that is connected through a shared center structure, such as when the arms 112A, 112B, 122A, and 122B are part of a single injection-molded structure. The input arms 112A, 112B, 122A, and 122B may alternatively be separate structures placed in close proximity such that the input arms 112A, 112B, 122A, and 122B are within reach of a single finger when operating the user input element 100.

The input arms 112A, 112B, 122A, and 122B may be coupled to mechanical structures that lock input from one or more of the input arms. For example, user input may be restricted to only one axis by locking input from arms 112A and 112B along a first axis, such as by preventing a user from depressing either of the arms 112A or 112B.

A plurality of fill tabs 114A, 114B, 116A, and 116B may be arranged around the arms 112A, 112B, 122A, and 122B. In some embodiments, the fill tabs 114A, 114B, 116A, and 116B may be shaped as wedges that fit between generally rectangular-shaped arms to form a circular structure, in which the fill tabs 114A, 114B, 116A, and 116B complete a circumference of a circle extending around the arms 112A, 112B, 122A, and 122B. Each of the fill tabs 114A, 114B, 116A, and 116B is thus located between two input arms. For example, fill tab 114A is located between arms 112A and 122A, fill tab 114B is located between arms 112B and 122B, fill tab 116A is located between arms 112A and 122B, and fill tab 116B is located between arms 112B and 122A.

In some embodiments, the fill tabs 114A, 114B, 116A, and 116B may be coupled to mechanical structures that adjust a height of the top surface of the fill tabs 114A, 114B, 116A, and 116B. When locking out one or more axes from user input, the fill tabs corresponding to the locked-out axes may be raised. For example, fill tabs 114A and 114B may be raised to lock out user input along axis 130 and allow user input only along axis 132. As another example, fill tabs 116A and 116B may be raised to lock out user input along axis 132 and allow user input only along axis 130. As a further example, fill tabs 114A, 114B, 116A, and 116B may all be raised to lock out user input along axis 130 and axis 132, such that the user input element 100 functions as a button.

A configuration selector ring 110 may be included to allow a selection of a configuration for the user input element 100. The ring 110 may allow may include positions 120A, 120B, 120C, and 120D that a user selects by rotating ring 110 until a desired one of the positions 120A, 120B, 120C, or 120D aligns with indicator 118. The indicator 118 may correspond to detents that allow the ring 110 to snap and lock into the positions 120A, 120B, 120C, and 120D. Rotating the ring 110 may change the configuration of mechanical structures coupled to the fill tabs 114A, 114B, 116A, and 116B, the input arms 112A, 112B, 122A, and 122B, and/or other structures to restrict user input to certain kinds of inputs. For example, in position 120A corresponding to a first configuration the user input element 100 may allow unrestricted user input, in position 120B corresponding to a second configuration the user input element 100 may allow user input only along axis 132, in position 120C corresponding to a third configuration the user input element 100 may function as a button by restricting motion along axis 130 and axis 132, and in position 120D corresponding to a fourth configuration the user input element 100 may allow user input only along axis 130.

An example user input device 200 of a gaming controller with a user input element 100 configured in the four configurations corresponding to position 120A, 120B, 120C, and 120D is shown in FIG. 2A, FIG. 2B, FIG. 2C, and FIG. 2D, respectively. The user may change the configuration of the user input element 100 by rotating the ring 110 from position 120A to 120B to reconfigure the user input element for the second configuration of FIG. 2B. The user may change the configuration of user input element 100 by rotating the ring 110 from position 120B to 120C to reconfigure the user input element for the third configuration of FIG. 2C. The user may change the configuration of user input element 100 by rotating the ring 100 from position 120C to 120D to reconfigure the user input element for the fourth configuration of FIG. 2D. The user input device 200 may include additional elements, such as one or more buttons 202, a conventional direction pad 204, and/or a joystick 206.

Figure 3:
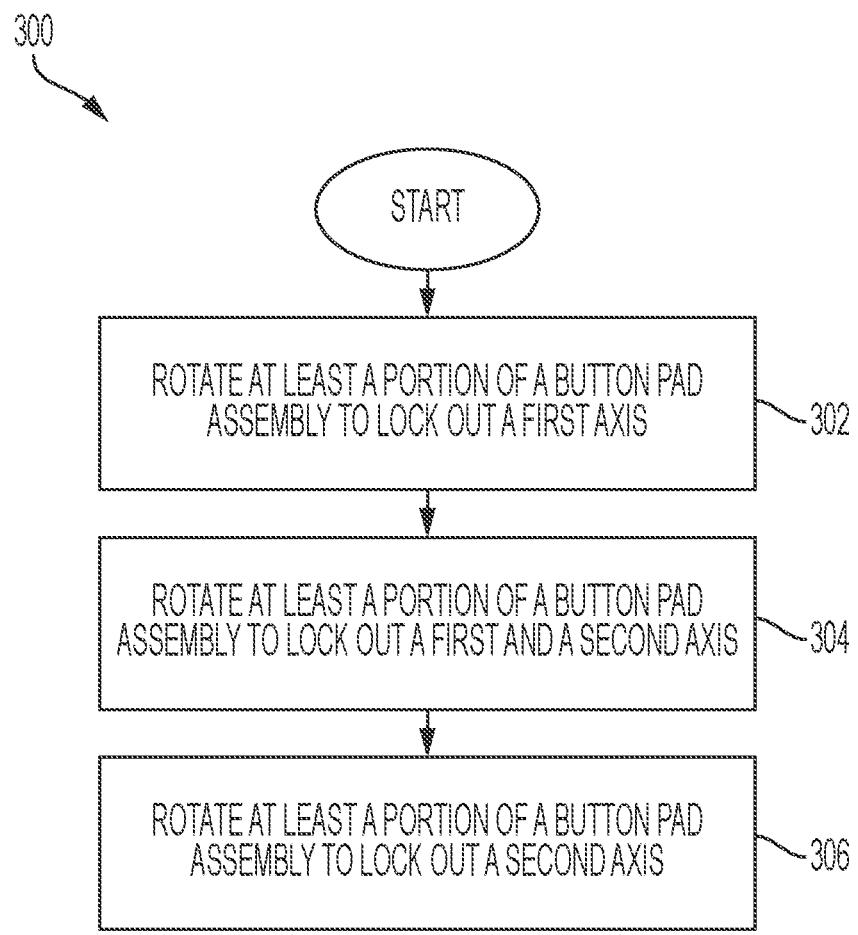
FIG. 3 is a flow chart illustrating a method of configuring a user input element according to some embodiments of the disclosure.

The reconfiguration of the user input element may be performed according to a method shown in FIG. 3. FIG. 3 is a flow chart illustrating a method of configuring a user input element according to some embodiments of the disclosure. A method for operating user input element 300 may include, at block 302, rotating at least a portion of a button pad assembly, such as the ring 110 of the user input element 100 of FIG. 1, to lock out a first axis. The rotating of block 302 may be performed by a user to reconfigure of their own choice or by being prompted by an application receiving input from the user input device to reconfigure the button pad assembly. The rotating of block 302 may alternatively be performed by a motor or other component coupled to the ring 110 to reconfigure the button pad assembly based on a decision (e.g., rule) executed by a controller coupled to the button pad assembly, such as in response to an instruction received from a processor of an information handling system executing an application receiving input from the user input device.

At appropriate times, the method 300 may continue to reconfigure the button pad assembly by proceeding to block 304 and/or block 306. At block 304, the method 300 may include rotating at least a portion of the button pad assembly to lock out a first and a second axis. At block 306, the method 300 may include rotating at least a portion of the button pad assembly to lock out a second axis.

Figure 4A:
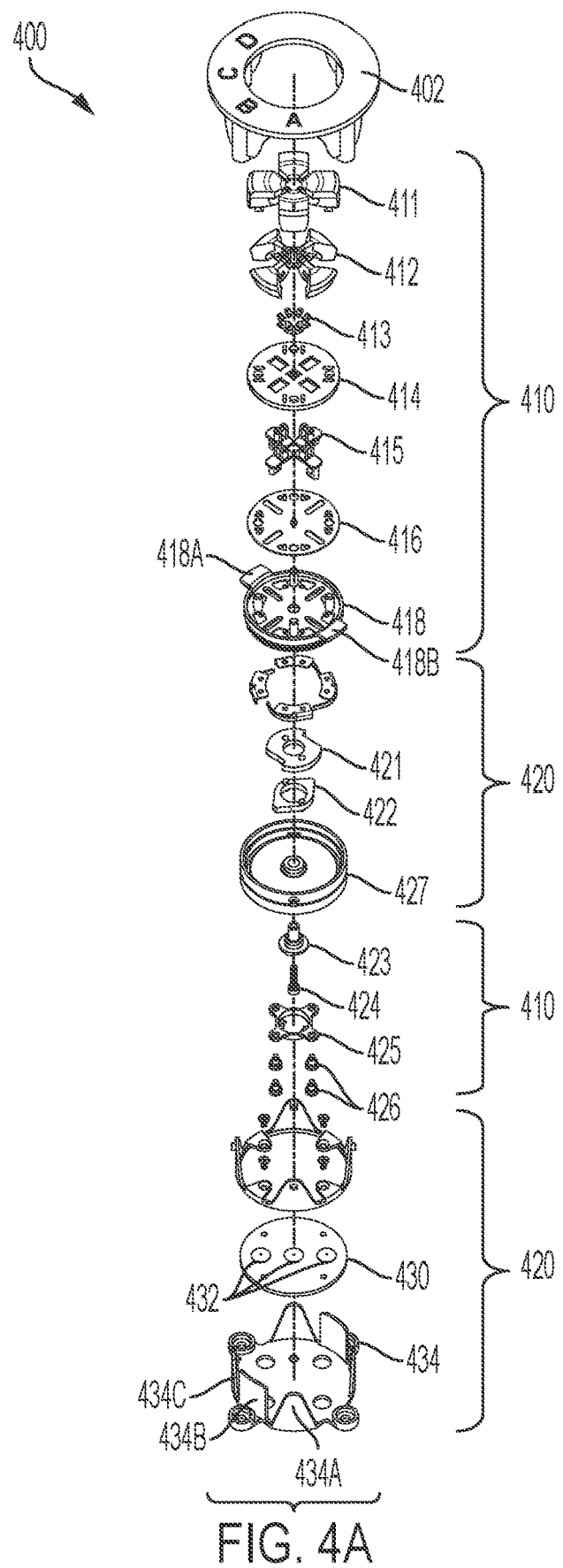
FIG. 4A is an exploded view of a configurable direction pad in a first configuration according to some embodiments of the disclosure.
Figure 4B:
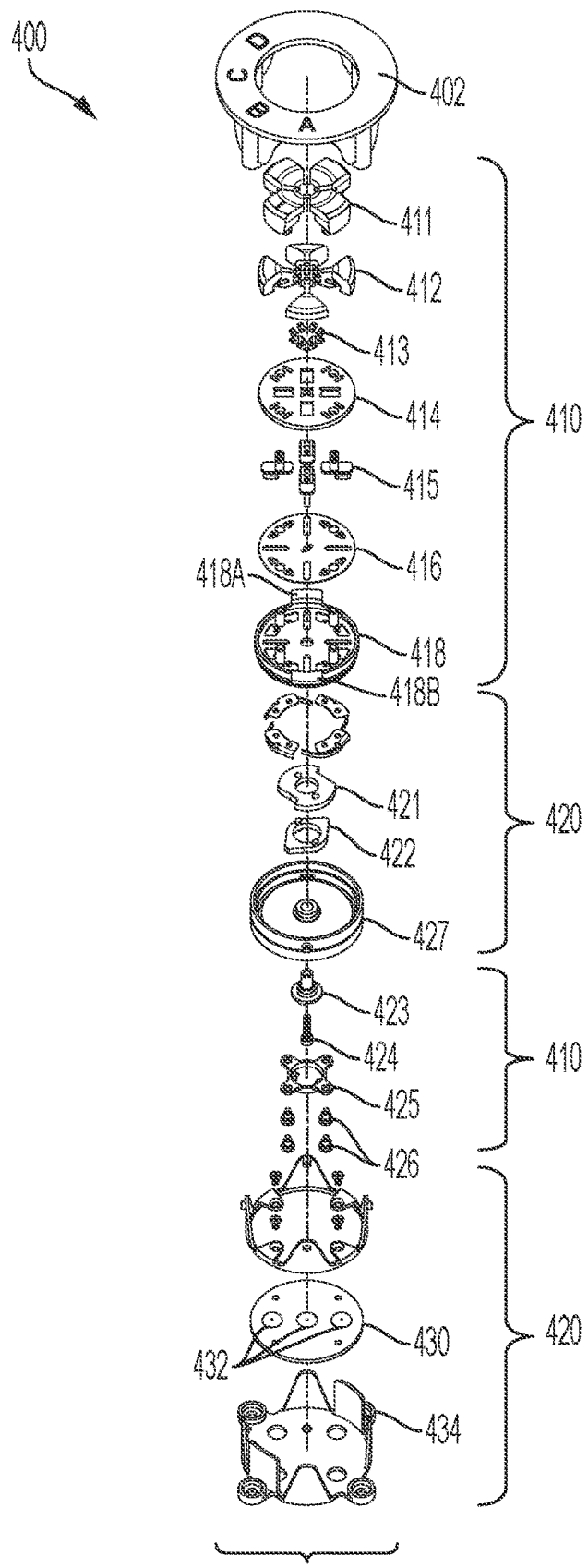
FIG. 4B is an exploded view of a configurable direction pad in a second configuration according to some embodiments of the disclosure.
Figure 4C:
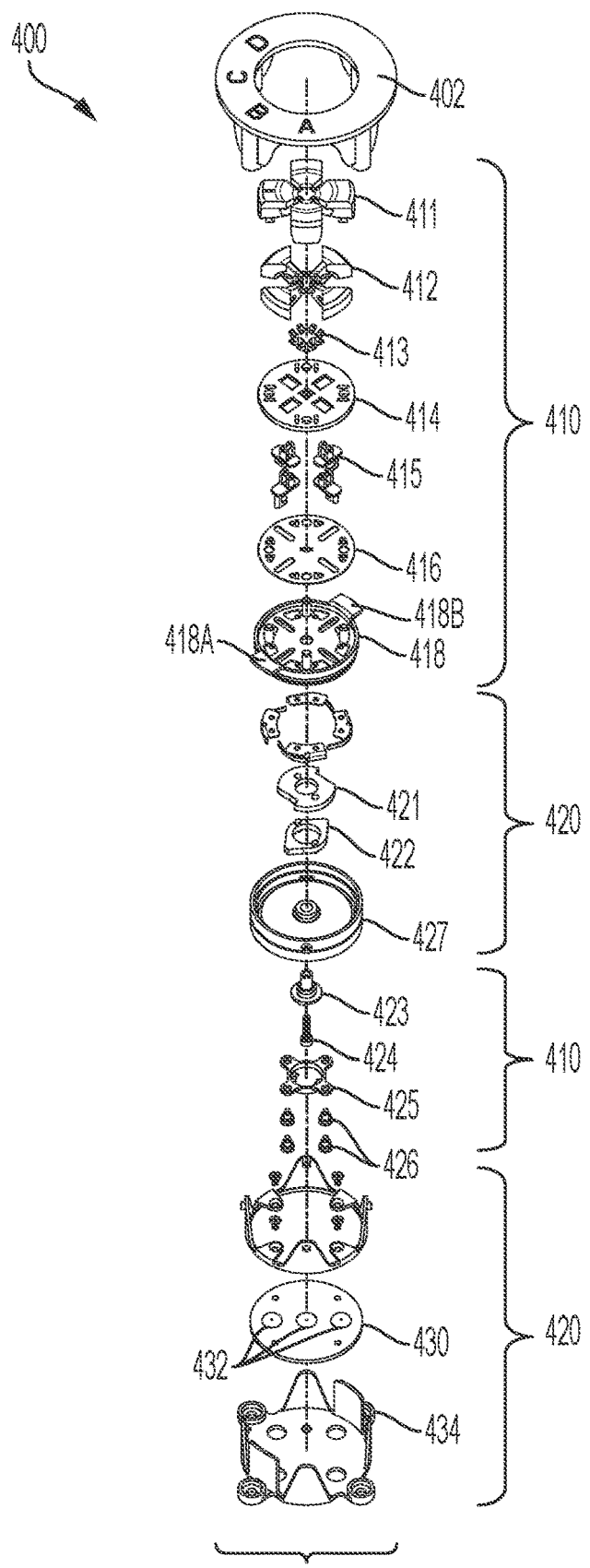
FIG. 4C is an exploded view of a configurable direction pad in a third configuration according to some embodiments of the disclosure.
Figure 4D:
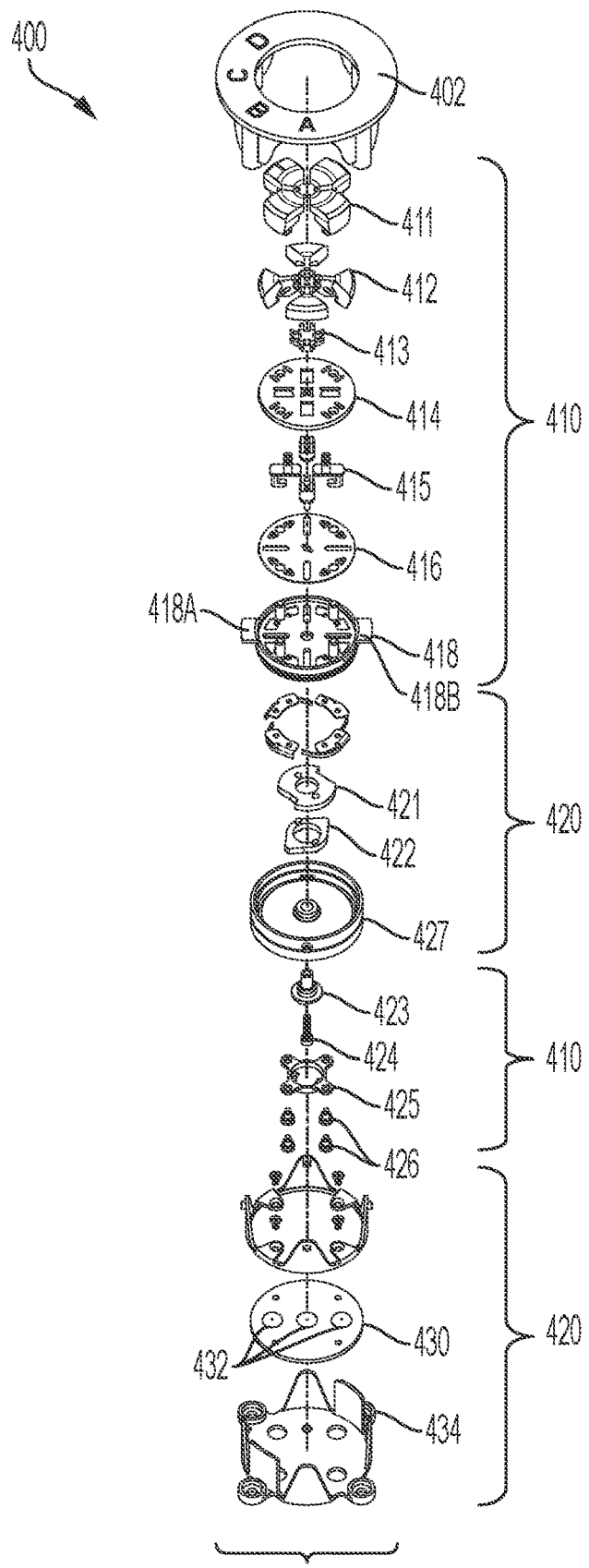
FIG. 4D is an exploded view of a configurable direction pad in a fourth configuration according to some embodiments of the disclosure.

In some embodiments, the button pad assembly, such as the user input element 100 of FIG. 1, may be reconfigured by mechanical components coupled components shown in FIG. 1 such as the arms and fill tabs. FIGS. 4A-D illustrate configurations of mechanical components for reconfiguring the user input element 100, although other mechanical components or different configurations of the illustrated mechanical components may be used in a reconfiguration mechanism. FIG. 4A is an exploded view of a configurable direction pad in a first configuration according to some embodiments of the disclosure. FIG. 4B is an exploded view of a configurable direction pad in a second configuration according to some embodiments of the disclosure. FIG. 4C is an exploded view of a configurable direction pad in a third configuration according to some embodiments of the disclosure. FIG. 4D is an exploded view of a configurable direction pad in a fourth configuration according to some embodiments of the disclosure.

A user input element 400 may include a selection ring 402 coupled to a rotating subassembly 410 and a fixed subassembly 420. The rotating subassembly 410 may move with rotation of the selection ring 402 relative to the fixed subassembly 420 to change the interaction of parts within the rotating subassembly 410 with parts within the fixed subassembly 420 to cause the reconfiguration of the user input element 100. Rotating the selection ring 402 may change the interaction of a configurator wheel 418 with a configuration wheel 434. For example, changing the alignment of features 418A and 418B of the configurator wheel 418 with respect to features 343A, 434B, and 434C may change the allowed motion of a pad structure 411. Fixed features 434A, 434B, and 434C may be different shapes to cause the different interactions. When rotating features 418A and 418B align with fixed features 434A, the rotating features 418A and 418B may be allowed to pivot around curved edges of the fixed features 434A to restrict movement to one axis corresponding to an axis perpendicular to the axis of an imaginary line drawn between fixed features 434A. When rotating features 418A and 418B align with fixed features 434B, the rotating features 418A and 418B may be prohibited from pivoting around straight edges of the fixed features 434B. When rotating features 418A and 418B align with fixed features 434C, the rotating features 418 and 418B may be allowed to pivot around curved edges of the fixed features 434C to restrict movement to one axis corresponding to an axis perpendicular to the axis of an imaginary line drawn between fixed features 434C.

Within the rotating subassembly 410, a set 412 of fill tabs may couple to the pad structure 411 to form a completed circle. The set 412 of fill tabs may be coupled to elevators 415 through a housing structure 414. Cams 421 and 422 of fixed subassembly 420 may interact with the elevators 415 to raise and lower parts of the set 412 of fill tabs to provide different tactile feels to a user based on the configuration of the user input element 400. As the ring 402 is rotated, and the rotating subassembly 410 with it, the cams 421 and 422 cause the elevators 415 to move in and out radially which raises and lowers a surface of individual fill tabs within the set 412 of fill tabs. Raising certain fill tabs, such as shown in FIG. 4B, may allow the pad structure 411 to mimic a two button element. Raising all fill tabs may allow the pad structure 411 to mimic a single button. In certain embodiments, rotational cam may interact with shuttle pins such that they confirm up/down position of cosmetic spacers (e.g., fill tabs) to change the look, feel, and/or response of the direction pad.

In some embodiments, the surface of the pad assembly, e.g., all of the pad structure 411 and the set 412 of fill tabs may be elevated to mimic a button in a configuration in which all axes are locked out. The cam 424 may interact with rotating subassembly 410 to lift the pad structure 411 and the set 412 of fill tabs. For example, cam 423 may have a physical bump that hits a corresponding bump on element 425. That interaction makes the corresponding assembly lift up because the element 425 is spring biased up. Pressure on the keycaps at the top of the assembly will force the corresponding assembly plus the element 425 to move downward compressing the biasing springs. That downward motion of the element 425 contacts a switch dome 432 on the PCB 430.

Other elements are provided to attach components of the rotating subassembly 410 and the fixed subassembly 420, including element 413, element 416, element 424, elements 425, elements 426, and housing 427. The components within the subassemblies 410 and 420 couple the pad structure 411 to switches 432 coupled to a printed circuit board (PCB) 430. The switches 432 generate electrical signals corresponding to user input provided to the pad structure 411. Preventing certain motions, such as preventing depressing the pad structure 411 along a certain axis, may restrict the pad structure 411 from activating certain switches 432. The PCB 430 may carry electrical signals generated by switches 432 to other components, such as a controller, a processor, and/or a communications interface, at which the user input may be further processed and used to interact with an application executing on an information handling system.

Figure 5A:
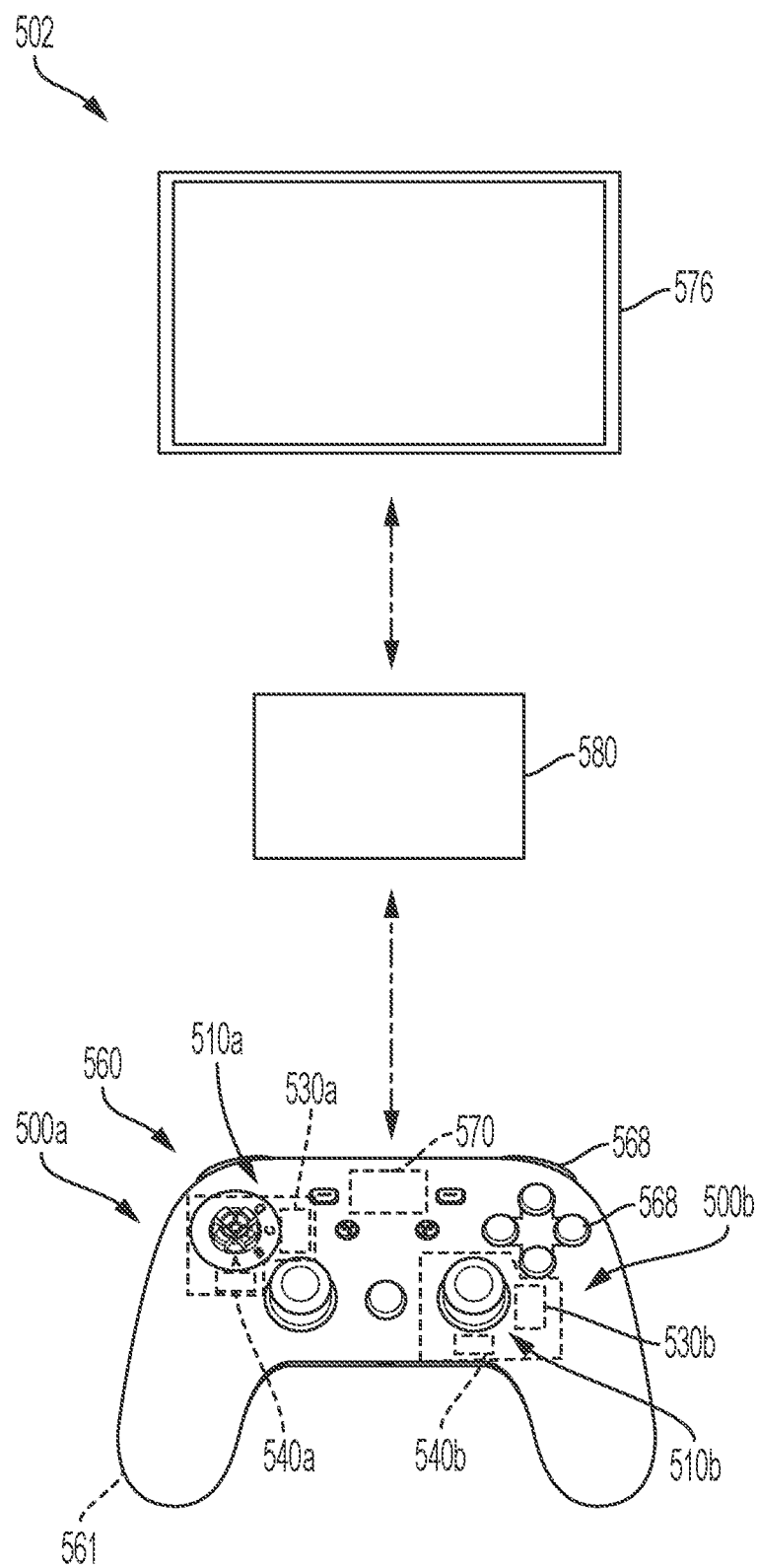
FIG. 5A is a schematic diagram of an example of a system that includes a user input device according to one or more aspects of the present disclosure.
Figure 5B:
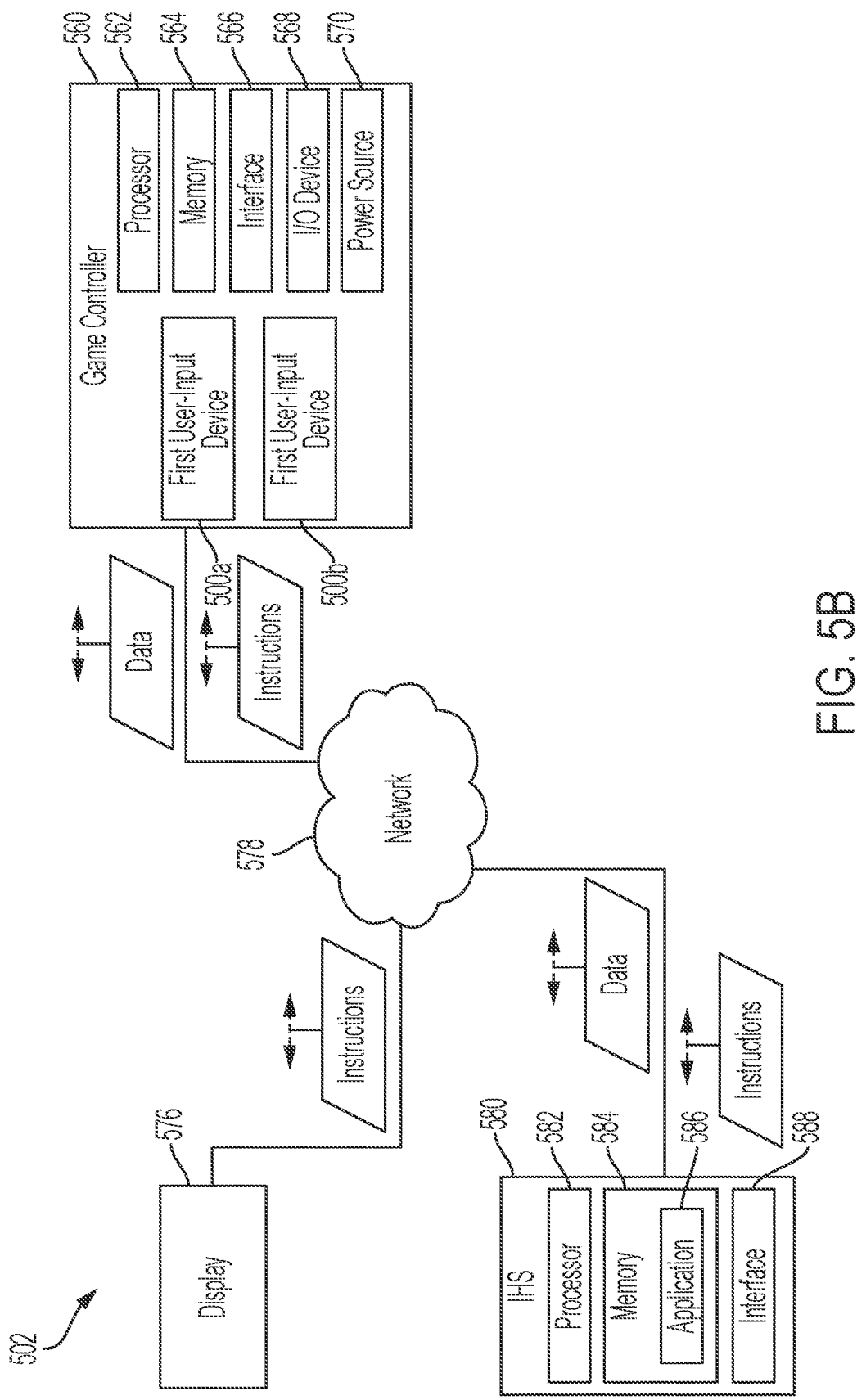
FIG. 5B is a block diagram of an example of the system of FIG. 5A.

Referring now to FIG. 5A and FIG. 5B, a system 502 for receiving user input and/or providing feedback through a user-input device (e.g., 500a, 500b) is shown. System 502 includes one or more user input devices 560, a display 576, and one or more information handling systems (IHS) 580 (e.g., video game console, entertainment console, personal computer, or other multimedia device) configured to execute one or more applications (e.g., video games). In some embodiments, the IHS 580 executing applications may be integrated with the display 576. In some embodiments, the IHS 580 executing applications may be integrated with one or more of the user input devices 560. In some configurations, display 576 and IHS 580 can be integrated with user input devices 560 as part of a mobile computing system or other information handling system such that the applications are executed at the user input devices 560.

User input device 560 is in communication with IHS 580 (e.g., wired or wireless communication) and is configured to send and receive signals (e.g., user input signal) with the external device to navigate or otherwise control the applications. For example, as shown in FIG. 5A, user input device 560 is a video game controller, IHS 480 is a gaming console, and display 476 is a television. In some such configurations, the various devices of system 502 (e.g., user input devices 560, IHS 580, and display 576) may be communicatively coupled to each other via one or more networks 578 (e.g., a Bluetooth personal area network (PAN), an Ethernet local area network (LAN), a wireless local area network, a wide area network (WAN) or other network).

User input device 560 can include a controller casing 561 (e.g., shell) that defines an interior cavity that is configured to at least partially accommodate a first user input element 500a, a second user input element 500b, a third user input element 568, or more. Input elements 500a and 500b may include or correspond to an embodiment of a configurable direction pad with aspects of embodiments of input elements disclosed herein. For example, a first input element 500a may include a direction pad 510a coupled to a configuration selector 530a and reconfiguration mechanism 540a. A second input element 500b may include a joystick assembly 510b coupled to a configuration selector 530b and a reconfiguration mechanism 540b. Joystick assemblies 510a and 510b extend from controller casing 561 and are configured to manipulate by a user. A user may operate (e.g., rotate) the first and second user input elements 500a, 500b, as described herein, to provide input to an application executing on the IHS 580. Axes of the joysticks 410a and 410b may be locked out according to mechanisms described with reference to the direction pad embodiments of FIG. 1, FIG. 2A, FIG. 2B, FIG. 2C, FIG. 2D, FIG. 4A, FIG. 4B, FIG. 4C, and/or FIG. 4D. The user input elements 500a and 500b may alternatively include one or two reconfigurable direction pads with aspects of the embodiments of FIG. 1, FIG. 2A, FIG. 2B, FIG. 2C, FIG. 2D, FIG. 4A, FIG. 4B, FIG. 4C, and/or FIG. 4D.

FIG. 5B illustrates electrical components of a user input device for operating reconfigurable user input elements, such as a reconfigurable direction pad, according to some embodiments of the disclosure. For example, user input device 560 may include processor 562, a memory 564, an interface 566, an input/output (I/O) device 568, a power source 570, or combination thereof. The user input device 560 in FIG. 5A and FIG. 5B may not include all of the components shown and/or may include additional components. Processor 562 may be a central processing unit (CPU) or other computing circuitry (e.g., a microcontroller, one or more application specific integrated circuits (ASICs), or the like) and may have one or more processing cores. Memory 564 may include read only memory (ROM) devices, random access memory (RAM) devices, one or more hard disk drives (HDDs), flash memory devices, solid state drives (SSDs), other devices configured to store data in a persistent or non-persistent state, or a combination of different memory devices. Memory 564 may store instructions that, when executed by processor 562, cause processor 562 to perform the operations in connection with user input device 560. Additionally, memory 564 may store one or more thresholds, data, preferences, or other settings. For example, memory 564 may store configuration data for the available reconfigurations of first user input element 500a, second user input element 500b, or both.

Interfaces 566, such as wireless interfaces, may be configured to enable wireless communication between user input device 560 and external device 580, display 576, or both. In some implementations, wireless interfaces 566 include a long range (LoRa) interface, a Wi-Fi interface (e.g., an Institute of Electrical and Electronics Engineers (IEEE) 802.11 interface), a cellular interface (e.g., a fourth generation (4G) or long term evolution (LTE) interface, a fifth generation (5G) new radio (NR) interface, or the like), a Bluetooth interface, a Bluetooth low energy (BLE) interface, a Zigbee interface, another type of network interface, or the like. I/O device 568 includes one or more switches (e.g., depressible buttons, triggers, or the like), one or more touchscreens, a microphone, a camera, one or more speakers, one or more light sources, vibration devices, or other types of devices that enable a user to receive information from or provide information to user input device 560.

IHS 580 may be configured to support and operate one or more electronic applications (e.g., 586), such as a video game, video streaming platform, music streaming platform, or other media platform. IHS 580 is referred to broadly and includes any suitable processor-based device such as, for example, video game console, a hand-held console, a desktop computer, a laptop computer, or a mobile computing device a tablet, a digital media or entertainment device, or another type of electronic device. IHS 580 may include at least a processor 582, a memory 584, and an interface 588 to enable communication with user input device 560, and optionally with display 576. Processor 582 may be configured to execute instructions stored at memory 584 to cause IHS 580 to perform the operations described herein. In some implementations, IHS 580 can be configured to access a wireless network or the Internet (e.g., via an application on IHS 580) or to access a web application or web service hosted by a server, and thereby provide a user interface for enabling a user to access an application 586. In some configurations, IHS 580 is configured to act as an intermediary between user input device 560 and display 576. For example, IHS 580 may receive a user input from controller 560 (e.g., at device 500a) and transmit and/or process the user input to display 576 to change the displayed environment (e.g., navigation between icons, rotating a point of view of a character, select a visual prompt, or otherwise changing the display environment). In some configurations, IHS 580 is configured to send instructions (e.g., signals) to user input device 560 to transmit information to the user. For example, based on a programmable setting of application 586, IHS 580 may transmit one or more instructions to cause user input element 500a, user input element 500b, or both, to adjust configuration and lock out one or more axis of input. In some configurations, a user may transmit (e.g., via user input device 560) a configuration selection to IHS 580, which can then transmit one or more signals to user input device 560 to reconfigure one or more of the user input elements 410a and 410b. In some such configurations, the configuration may be selected locally, for a single application (e.g., 586), or globally, for all applications.

Additionally, or alternatively, application 586 may cause IHS 580 to transmit instructions to user input device 560 to cause user input elements 500a, device 500b, or both, to adjust a configuration, such as by controlling a motor to cause a rotation or other application of force to change the configuration of a user input element. In an illustrative example, application 586 may allow a user to control a character in a gaming environment. When the character interacts with an obstacle (e.g., a wall), IHS 580 and application 586 can determine the movement of the character is hindered. Based on this determination, IHS 580 can transmit an adjust configuration instruction to user input element 500a—which controls character movement—and the user input element 500a may adjust lock out one or more axes for user input. In this way, the user may be informed (e.g., via varied input configurations) of the obstacle in a manner that is not possible with conventional controllers. In this way and others, system 502 and user input elements 500a, 500b, may enable application developers to include a more immersive experience by providing additional feedback to the users.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 6:
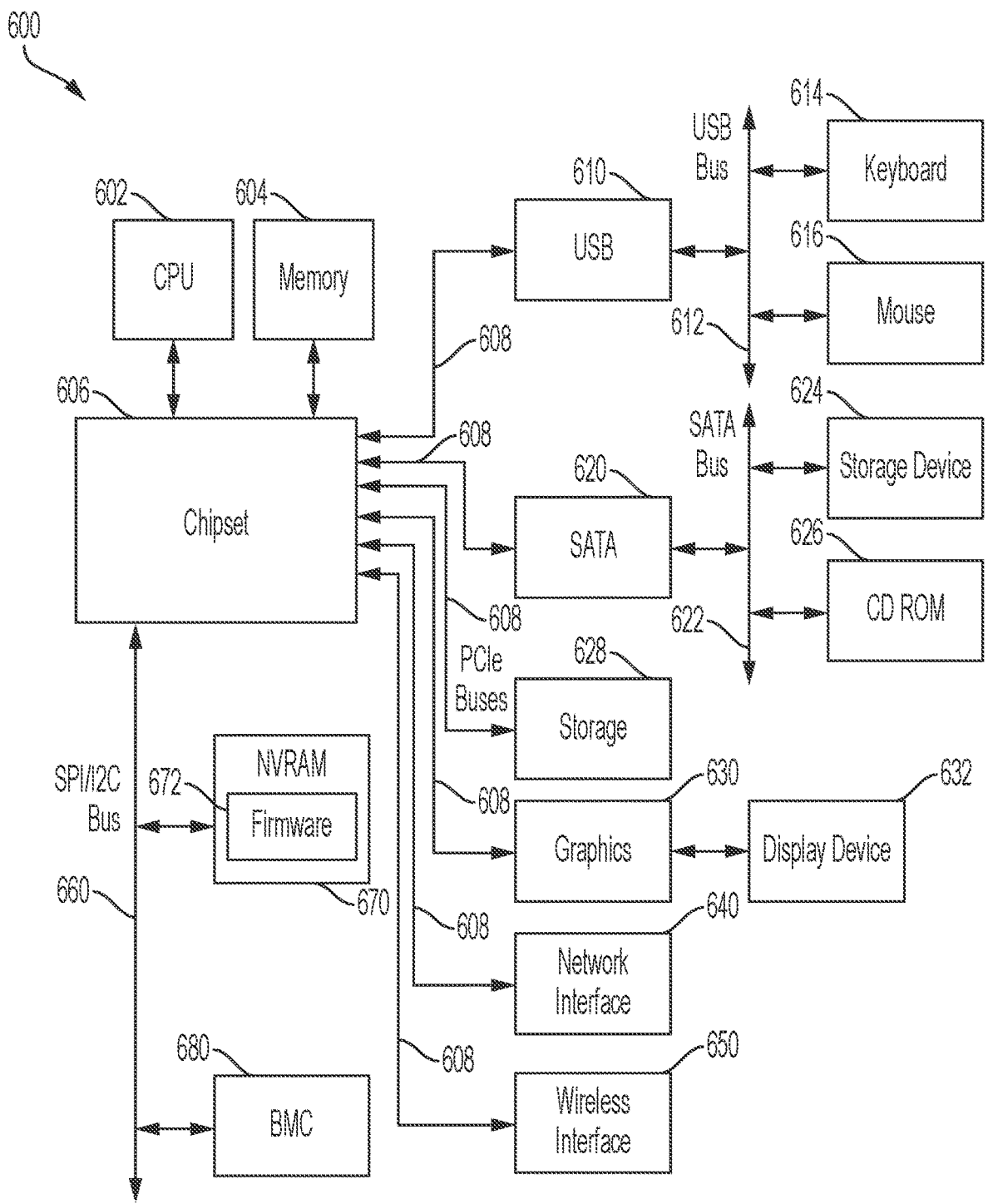
FIG. 6 is a schematic block diagram of an example information handling system according to some embodiments of the disclosure.

FIG. 6 illustrates an example information handling system 600, which may be one configuration for the IHS 580 illustrated in FIG. 5A. Information handling system 600 may include a processor 602 (e.g., a central processing unit (CPU)), a memory (e.g., a dynamic random-access memory (DRAM)) 604, and a chipset 606. In some embodiments, one or more of the processor 602, the memory 604, and the chipset 606 may be included on a motherboard (also referred to as a mainboard), which is a printed circuit board (PCB) with embedded conductors organized as transmission lines between the processor 602, the memory 604, the chipset 606, and/or other components of the information handling system. The components may be coupled to the motherboard through packaging connections such as a pin grid array (PGA), ball grid array (BGA), land grid array (LGA), surface-mount technology, and/or through-hole technology. In some embodiments, one or more of the processor 602, the memory 604, the chipset 606, and/or other components may be organized as a System on Chip (SoC).

The processor 602 may execute program code by accessing instructions loaded into memory 604 from a storage device, executing the instructions to operate on data also loaded into memory 604 from a storage device, and generate output data that is stored back into memory 604 or sent to another component. The processor 602 may include processing cores capable of implementing any of a variety of instruction set architectures (ISAs), such as the x86, POWERPC®, ARM®, SPARC®, or MIPS® ISAs, or any other suitable ISA. In multi-processor systems, each of the processors 602 may commonly, but not necessarily, implement the same ISA. In some embodiments, multiple processors may each have different configurations such as when multiple processors are present in a big-little hybrid configuration with some high-performance processing cores and some high-efficiency processing cores. The chipset 606 may facilitate the transfer of data between the processor 602, the memory 604, and other components. In some embodiments, chipset 606 may include two or more integrated circuits (ICs), such as a northbridge controller coupled to the processor 602, the memory 604, and a southbridge controller, with the southbridge controller coupled to the other components such as USB 610, SATA 620, and PCIe buses 608. The chipset 606 may couple to other components through one or more PCIe buses 608.

Some components may be coupled to one bus line of the PCIe buses 608, whereas some components may be coupled to more than one bus line of the PCIe buses 608. One example component is a universal serial bus (USB) controller 610, which interfaces the chipset 606 to a USB bus 612. A USB bus 612 may couple input/output components such as a keyboard 614 and a mouse 616, but also other components such as USB flash drives, or another information handling system. Another example component is a SATA bus controller 620, which couples the chipset 606 to a SATA bus 622. The SATA bus 622 may facilitate efficient transfer of data between the chipset 106 and components coupled to the chipset 606 and a storage device 624 (e.g., a hard disk drive (HDD) or solid-state disk drive (SDD)) and/or a compact disc read-only memory (CD-ROM) 626. The PCIe bus 608 may also couple the chipset 606 directly to a storage device 628 (e.g., a solid-state disk drive (SDD)). A further example of an example component is a graphics device 630 (e.g., a graphics processing unit (GPU)) for generating output to a display device 632, a network interface controller (NIC) 640, and/or a wireless interface 650 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces). In one example embodiment, chipset 606 may be directly connected to an individual end point via a PCIe root port within the chipset and a point-to-point topology as shown in FIG. 6.

The chipset 606 may also be coupled to a serial peripheral interface (SPI) and/or Inter-Integrated Circuit (I2C) bus 660, which couples the chipset 606 to system management components. For example, a non-volatile random-access memory (NVRAM) 670 for storing firmware 672 may be coupled to the bus 660. As another example, a controller, such as a baseboard management controller (BMC) 680, may be coupled to the chipset 606 through the bus 660. BMC 680 may be referred to as a service processor or embedded controller (EC). Capabilities and functions provided by BMC 680 may vary considerably based on the type of information handling system. For example, the term baseboard management system may be used to describe an embedded processor included at a server, while an embedded controller may be found in a consumer-level device. As disclosed herein, BMC 680 represents a processing device different from processor 602, which provides various management functions for information handling system 600. For example, an embedded controller may be responsible for power management, cooling management, and the like. An embedded controller included at a data storage system may be referred to as a storage enclosure processor or a chassis processor.

System 100 may include additional processors that are configured to provide localized or specific control functions, such as a battery management controller. Bus 660 can include one or more busses, including a Serial Peripheral Interface (SPI) bus, an Inter-Integrated Circuit (I2C) bus, a system management bus (SMBUS), a power management bus (PMBUS), or the like. BMC 680 may be configured to provide out-of-band access to devices at information handling system 600. Out-of-band access in the context of the bus 660 may refer to operations performed prior to execution of firmware 672 by processor 602 to initialize operation of system 600.

Firmware 672 may include instructions executable by processor 602 to initialize and test the hardware components of system 600. For example, the instructions may cause the processor 602 to execute a power-on self-test (POST). The instructions may further cause the processor 602 to load a boot loader or an operating system (OS) from a mass storage device. Firmware 672 additionally may provide an abstraction layer for the hardware, such as a consistent way for application programs and operating systems to interact with the keyboard, display, and other input/output devices. When power is first applied to information handling system 600, the system may begin a sequence of initialization procedures, such as a boot procedure or a secure boot procedure. During the initialization sequence, also referred to as a boot sequence, components of system 600 may be configured and enabled for operation and device drivers may be installed. Device drivers may provide an interface through which other components of the system 600 can communicate with a corresponding device. The firmware 672 may include a basic input-output system (BIOS) and/or include a unified extensible firmware interface (UEFI). Firmware 672 may also include one or more firmware modules of the information handling system. Additionally, configuration settings for the firmware 672 and firmware of the information handling system 600 may be stored in the NVRAM 670. NVRAM 670 may, for example, be a non-volatile firmware memory of the information handling system 600 and may store a firmware memory map namespace 600 of the information handling system. NVRAM 670 may further store one or more container-specific firmware memory map namespaces for one or more containers concurrently executed by the information handling system.

Information handling system 600 may include additional components and additional busses, not shown for clarity. For example, system 600 may include multiple processor cores (either within processor 602 or separately coupled to the chipset 606 or through the PCIe buses 608), audio devices (such as may be coupled to the chipset 606 through one of the PCIe busses 608), or the like. While a particular arrangement of bus technologies and interconnections is illustrated for the purpose of example, one of skill will appreciate that the techniques disclosed herein are applicable to other system architectures. System 600 may include multiple processors and/or redundant bus controllers. In some embodiments, one or more components may be integrated together in an integrated circuit (IC), which is circuitry built on a common substrate. For example, portions of chipset 606 can be integrated within processor 602. Additional components of information handling system 600 may include one or more storage devices that may store machine-executable code, one or more communications ports for communicating with external devices, and various input and output (I/O) devices, such as a keyboard, a mouse, and a video display.

In some embodiments, processor 602 may include multiple processors, such as multiple processing cores for parallel processing by the information handling system 600. For example, the information handling system 600 may include a server comprising multiple processors for parallel processing. In some embodiments, the information handling system 600 may support virtual machine (VM) operation, with multiple virtualized instances of one or more operating systems executed in parallel by the information handling system 600. For example, resources, such as processors or processing cores of the information handling system may be assigned to multiple containerized instances of one or more operating systems of the information handling system 600 executed in parallel. A container may, for example, be a virtual machine executed by the information handling system 600 for execution of an instance of an operating system by the information handling system 600. Thus, for example, multiple users may remotely connect to the information handling system 600, such as in a cloud computing configuration, to utilize resources of the information handling system 600, such as memory, processors, and other hardware, firmware, and software capabilities of the information handling system 600. Parallel execution of multiple containers by the information handling system 600 may allow the information handling system 600 to execute tasks for multiple users in parallel secure virtual environments.

The schematic flow chart diagram of FIG. 3 is generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The operations described above as performed by a controller may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuitry may be configured as a general purpose processor capable of executing instructions contained in software and/or firmware.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An apparatus, comprising:
a user input element comprising at least four input arms arranged with at least two arms aligned along a first axis and at least two arms along a second axis;
a plurality of fill tabs arranged circumferentially around the first axis and the second axis, each fill tab of the plurality of fill tabs located between two input arms of the at least four input arms;
a configurator wheel coupled to each of the plurality of fill tabs, the configurator wheel comprising at least two rotatable features; and
a configuration wheel coupled to the configurator wheel, the configuration wheel comprising at least two fixed features, wherein the at least two fixed features are configured to interact with the at least two rotatable features to configure the user input element,
wherein the configurator wheel is configured to interact with the configuration wheel to provide at least four configurations for the user input element, the at least four configurations comprising:
a first configuration allowing user input along the first axis and the second axis;
a second configuration allowing user input along the first axis and disallowing user input along the second axis;
a third configuration disallowing user input along the first axis and disallowing user input along the second axis; and
a fourth configuration disallowing user input along the first axis and allowing user input along the second axis.

2. The apparatus of claim 1, wherein the at least two rotatable features of the configurator wheel are configured to interact with the at least two fixed features of the configuration wheel to lock out movement along a first axis and a second axis.

3. The apparatus of claim 2, wherein the at least two rotatable features comprise at least two tabs extending from a rotatable structure, wherein the user input element is configured to be configured by rotating the rotatable structure.

4. The apparatus of claim 1, further comprising first cams coupled to the plurality of fill tabs and to the configurator wheel, wherein the first cams are configured to adjust a height of a surface of the plurality of fill tabs.

5. The apparatus of claim 4, further comprising a second cam coupled to the plurality of fill tabs and to the configurator wheel, wherein the second cam is configured to adjust a height of a surface of the at least four input arms.

6. The apparatus of claim 5, wherein the second cam is configured to increase the height of the surface of the at least four input arms when the user input element is configured as a single button.

7. The apparatus of claim 1, further comprising a rotating ring coupled to configurator wheel, wherein the rotating ring is configured to allow a user to adjust the configuration of the user input element.

8. The apparatus of claim 7, wherein the rotating ring comprises detents corresponding to available configurations of the user input element.

9. The apparatus of claim 7, further comprising a motor coupled to the rotating ring.

10. The apparatus of claim 9, wherein the apparatus is a game controller.

11. The apparatus of claim 10, further comprising a controller configured to control the motor to configure the user input element according to received instructions.

12. The apparatus of claim 11, wherein the controller is processor for executing an application receiving user input from the user input element.

13. A user input device, comprising:
a button;
a configurable direction pad, comprising:
four input arms arranged with a first arm and a second arm aligned along a first axis and a third arm and a fourth arm aligned along a second axis;
a plurality of fill tabs arranged circumferentially around the first axis and the second axis, each fill tab of the plurality of fill tabs located between two input arms of the at least four input arms,
wherein the configurable direction pad is configured to provide at least four configurations, the at least four configurations comprising:
a first configuration allowing user input along the first axis and the second axis;
a second configuration allowing user input along the first axis and disallowing user input along the second axis;
a third configuration disallowing user input along the first axis and disallowing user input along the second axis; and
a fourth configuration disallowing user input along the first axis and allowing user input along the second axis;
a communications interface; and
a controller coupled to the button, to the configurable direction pad, and to the communications interface, wherein the controller is configured to:
receive user input through the button and the configurable direction pad; and transmit the user input through the communications interface.

14. The user input device of claim 13, wherein the configurable direction pad further comprises:
   a configurator wheel coupled to each of the plurality of fill tabs, the configurator wheel comprising at least two rotatable features; and
   a configuration wheel coupled to the configurator wheel, the configuration wheel comprising at least two fixed features, wherein the at least two fixed features are configured to interact with the at least two rotatable features to configure the user input element.

15. The user input device of claim 14, further comprising:
   a motor coupled to the configurator wheel and configured to rotate the configurator wheel to configure the configurable direction pad,
   wherein the controller is further configured to:
      receive an instruction to configure the configurable direction pad in a first configuration; and
      control the motor to configure the configurable direction pad in the first configuration.

16. The user input device of claim 14, wherein the configurable direction pad further comprises:
   first cams coupled to the plurality of fill tabs and to the configurator wheel, wherein the first cams are configured to adjust a height of a surface of the plurality of fill tabs.

17. A method, comprising:
   rotating a ring around a user input element to a first location at which a first feature of a configurator ring aligns with a second feature of a configuration ring such that the first feature interacts with the second feature to restrict movement of the user input element along a first axis;
   rotating a ring around the user input element to a second location at which the first feature of the configurator ring aligns with a third feature of the configuration ring such that the third feature interacts with the first feature to restrict movement of the user input element along the first axis and a second axis;
   rotating a ring around a user input element to a third location at which the first feature of the configurator ring aligns with a fourth feature of the configuration ring such that the fourth feature interacts with the first feature to restrict movement of the user input element along the second axis.

18. The method of claim 17, wherein rotating the ring around the user input element to the first location comprises:
   rotating the configurator ring;
   activating first cams to change a physical arrangement of the user input element to indicate restricted movement along the first axis.

19. The method of claim 18, wherein activating the first cams comprises:
   raising a plurality of fill tabs to configure the user input element to mimic a two button element with the two button element receiving user input along the first axis.

* * * * *